UNITED STATES PATENT OFFICE.

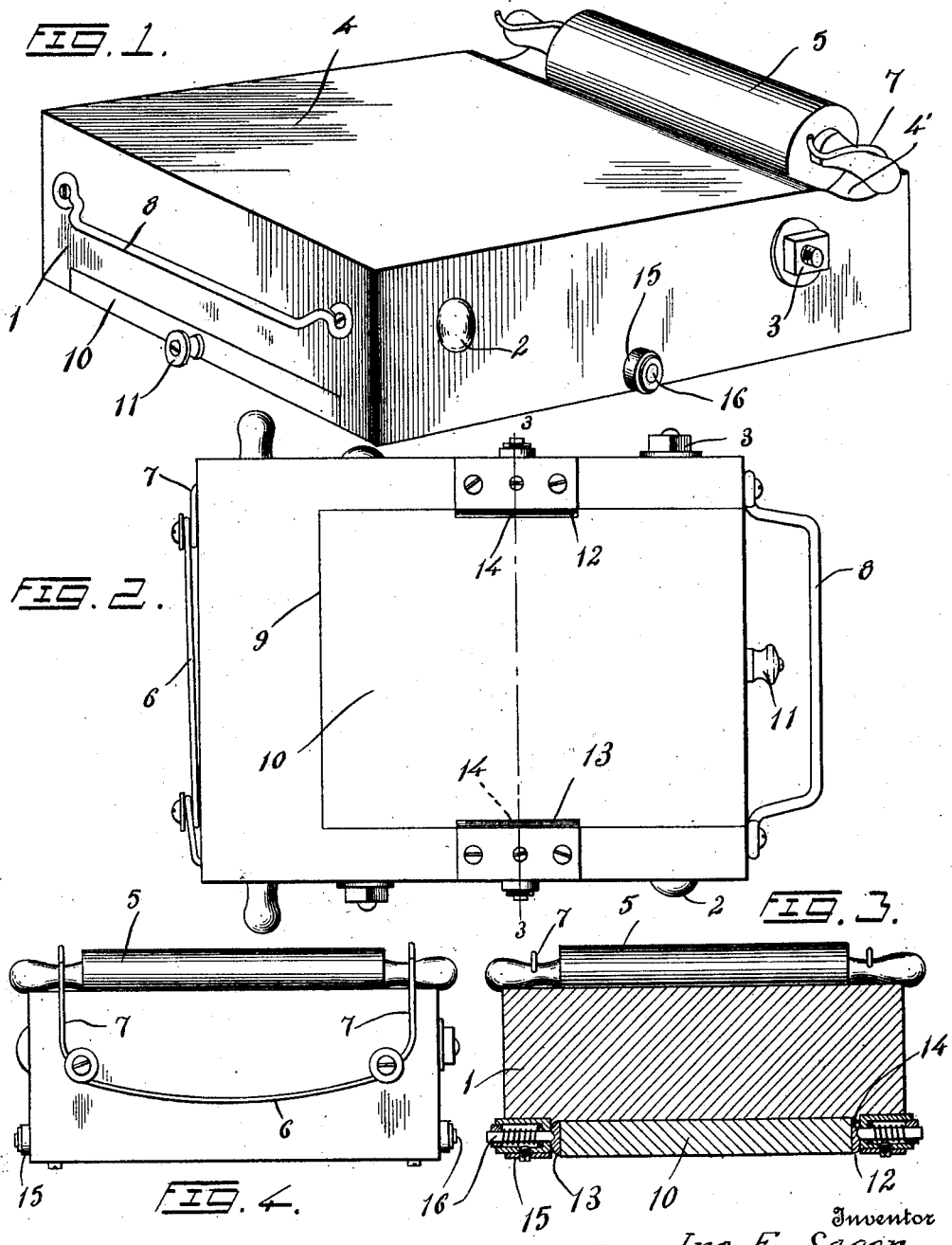

IRA E. SAGER, OF VICTOR, COLORADO.

KITCHEN DEVICE.

1,099,822. Specification of Letters Patent. Patented June 9, 1914.

Application filed September 6, 1912. Serial No. 718,995.

*To all whom it may concern:*

Be it known that I, IRA E. SAGER, a citizen of the United States, residing at Victor, in the county of Teller and State of Colorado, have invented new and useful Improvements in Kitchen Devices, of which the following is a specification.

This invention relates to portable meat blocks, primarily intended for use by campers or travelers, and embodies the desirable features which will hereinafter be fully described and claimed.

In the drawing, Figure 1 is a perspective view of the improvement. Fig. 2 is a plan view looking toward the opposite face of the block shown in Fig. 1. Fig. 3 is a transverse sectional view upon the line 3—3 of Fig. 2. Fig. 4 is a rear elevation of the block.

Among overland travelers or campers it is highly desirable, if not essential that their luggage shall contain as many articles as is necessary to add to the comfort of the travelers, and, of course, the said articles must necessarily be of a size and weight to not interfere with the portage of the same, nor with the compactness of the bundle making up the package In outfits of this character it is desirable that the camper or traveler be provided with a suitable member upon which meat for their food may be cut, and upon which the dough for their bread may be rolled. As the articles of the travelers are subjected to rough usage, the meat block must be so constructed as to withstand severe strain, and furthermore it is desirable that at least one face of the bread board will be so protected as to prevent the same being scarred through rough use, and in order to provide for this I have constructed a meat block comprising a substantially rectangular member which is of a light, but of an extremely strong construction, and which is provided with a pocket for the reception of the bread board, as well as with simple, but effective means for normally sustaining the rolling pin upon the block, and thus provide a unique article which is immediately attainable for the various purposes for which it is devised.

In the drawing, the numeral 1 designates a block which is preferably formed of some light but strong wood. The block is provided adjacent its ends with transversely arranged openings for the reception of bolts 2, and securing nuts 3, which are adapted to serve as reinforcements for the block to prevent the splitting of the same when under the force of the impact of the blows delivered upon one of the faces thereof.

The numeral 4 designates the face of the block which is designed to receive meat or other articles to be cut before cooking. This face is horizontally straight, and smooth, but is provided, adjacent one of its ends with a transversely arranged circular depression 4' for the reception of a rolling pin 5. Secured upon one of the ends of the block is a spring member 6, the same being provided with spaced arms 7—7 which overlie the face 4, and which are adapted to engage with the oppositely arranged handles of the rolling pin. The opposite end of the block is provided with a suitable handle 8 whereby the block may be readily transported. The face of the block opposite to that of the face 4 is provided with a substantially rectangular depression forming a pocket 9 which opens at the end of the block provided with the handle. This pocket is adapted to receive a rectangular dough or bread board 10 which has connected with one of its ends a suitable knob 11. The sides of the board 10 are recessed at approximately the central portion of the block, the said recesses receiving metallic plates 12 and 13, and each of the said plates is centrally provided with a reamed depression 14, the purpose of which will presently be set forth. The upper and lower longitudinal edges of the plates 12 and 13 are rounded toward the reamed portions of the plates for a purpose which will also be presently set forth.

Arranged in suitable casings 15 which are disposed within oppositely arranged openings in the sides of the board, and which communicate with the pocket 9 are spring pressed pintles 16. These pintles are adapted to co-act with the reamed or depressed portions in the side of the board to securely sustain the board within the pocket. By providing the plates with the rounded edges it will be noted that the board may be readily inserted, and retained within the pocket, the said rounded portions causing the pintles to retract within their casings until the depressions in the plate are brought into register with the said pintles. The depressions, as stated are reamed or funnel-shaped so that a pressure upon the knob 11 in a direction away from the board will cause the pintles to recede within their casings and permit of the board being removed from the pocket, when the board is removed, it may be placed upon the face 4 of the block, and retained thereon through the medium of the spring members which engage with the handles of the rolling pin. The dough may be rolled or molded upon the block by the rolling pin, or by such other articles as are required for performing such work.

Having thus described my invention, what I claim is:—

1. A device of the character described, including a block having a pocket formed in one face thereof and a recess in its opposite face, a board adapted to be retained in said pocket and spring clamps coöperating with the board to retain a member within the recess or retain the board upon the surface of the block.

2. A device of the character described comprising a rectangular block of solid wood having formed in one face thereof a pocket and in its opposite face a recess, a board removably mounted in said pocket, a pair of spring pressed pintles for retaining the board in said pocket and means coöperating with the board to retain a member within the recess or retain the board upon the surface of the block.

3. A device of the character described comprising a block, a board adapted to be retained upon the underside of said block, one end of the top of said block being recessed, spring arms secured upon opposite sides of said end of the block and having their free ends extended over the recess to retain a member within the recess or retain the board upon the surface of the block.

4. A device of the character described comprising a portable block having a pocket formed in one face thereof and a recess formed in its opposite face, a board slidably mounted in said pocket, means extending through the opposite longitudinal side faces of the block and adapted to coöperate with the opposite longitudinal side edges of the board for retaining the board within said recess, spring clamps secured upon one end of the block and having their free ends extended over the recess to retain a member within the recess or retain the board upon the surface of the block.

In testimony whereof I affix my signature in presence of two witnesse.

IRA E. SAGER.

Witnesses:
F. E. SIMONTON,
L. A. SCHOELL.

---

Copies of this patent may be obtained for five cents each, by addressing the "Commissioner of Patents, Washington, D. C."